US010885065B2

(12) United States Patent
Dunne et al.

(10) Patent No.: US 10,885,065 B2
(45) Date of Patent: Jan. 5, 2021

(54) DATA CONVERGENCE

(71) Applicant: INTERNATIONAL BUSINESS MACHINES CORPORATION, Armonk, NY (US)

(72) Inventors: Jonathan Dunne, Dungarvan (IE); Karen Forde, Dublin (IE); William Holmes, Dunshaughlin (IE); Andrew Penrose, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 15/725,623

(22) Filed: Oct. 5, 2017

(65) Prior Publication Data

US 2019/0108270 A1    Apr. 11, 2019

(51) Int. Cl.
*G06F 16/00* (2019.01)
*G06F 16/28* (2019.01)
*G06N 5/00* (2006.01)
*G06F 16/35* (2019.01)

(52) U.S. Cl.
CPC .......... *G06F 16/285* (2019.01); *G06F 16/355* (2019.01); *G06N 5/003* (2013.01)

(58) Field of Classification Search
CPC ..... G06F 16/285; G06F 16/355; G06N 5/003; G06N 20/00; G06N 7/005
See application file for complete search history.

(56) References Cited

U.S. PATENT DOCUMENTS

| 6,393,460 | B1 | 5/2002 | Gruen et al. |
| 7,039,638 | B2 | 5/2006 | Zhang et al. |
| 7,251,696 | B1 | 7/2007 | Horvitz |
| 7,424,516 | B2 | 9/2008 | Leeds |
| 7,783,745 | B1* | 8/2010 | Bhargava ............... G06Q 10/06 709/224 |
| 7,797,180 | B2 | 9/2010 | Srivastava |
| 8,055,592 | B2 | 11/2011 | Boyle et al. |
| 8,190,999 | B2 | 5/2012 | Chen et al. |

(Continued)

FOREIGN PATENT DOCUMENTS

| EP | 1271341 A2 | 1/2003 |
| WO | 02093414 A1 | 11/2002 |
| WO | 2010093678 A1 | 8/2010 |

OTHER PUBLICATIONS

Adams, "Conversation Thread Extraction and Topic Detection in Text-Based Chat", Sep. 2008, Thesis, Naval Postgraduate School, Monterey, California, 191 pages.

(Continued)

*Primary Examiner* — Alexander Khong
(74) *Attorney, Agent, or Firm* — Teddi E. Maranzano

(57) ABSTRACT

Embodiment for identifying data convergence are presented. First and second sets of data each comprising heterogeneous data are each processed in accordance with a data clustering algorithm so as to obtain a plurality of primary and secondary data clusters, respectively, where each data cluster comprising homogeneous data. The primary and secondary data clusters are analyzed with respect to time to identify convergence of data of the first and second sets of data to first and second topics, respectively. The first and second topics are compared to determine a pattern of data convergence for the first and second data sets.

15 Claims, 8 Drawing Sheets

(56) References Cited

U.S. PATENT DOCUMENTS

| | | | |
|---|---|---|---|
| 8,539,359 | B2 | 9/2013 | Rapaport et al. |
| 8,819,145 | B1 | 8/2014 | Gailloux et al. |
| 9,246,857 | B2 | 1/2016 | Moisa |
| 9,288,166 | B2 | 3/2016 | Scherpa et al. |
| 9,330,378 | B2 | 5/2016 | Bastide et al. |
| 9,372,915 | B2 | 6/2016 | Long et al. |
| 2004/0111479 | A1 | 6/2004 | Borden et al. |
| 2005/0138121 | A1 | 6/2005 | Banatwala et al. |
| 2009/0055381 | A1* | 2/2009 | Wu ................. G06F 40/258 |
| 2009/0070346 | A1* | 3/2009 | Savona .............. G06F 16/35 |
| 2009/0112588 | A1* | 4/2009 | Kummamuru ...... G06F 16/355 704/245 |
| 2010/0205541 | A1 | 8/2010 | Rapaport et al. |
| 2012/0240062 | A1 | 9/2012 | Passmore et al. |
| 2012/0254184 | A1* | 10/2012 | Choudhary ...... G06Q 30/0201 707/738 |
| 2012/0290950 | A1* | 11/2012 | Rapaport ............... H04L 51/32 715/753 |
| 2015/0154148 | A1* | 6/2015 | Lightner ................ G06N 5/04 704/9 |
| 2016/0065519 | A1 | 3/2016 | Waltermann et al. |
| 2016/0103932 | A1* | 4/2016 | Sathish .............. G06F 3/04883 715/767 |
| 2016/0196267 | A1* | 7/2016 | Hansen ................. H04L 67/02 707/749 |
| 2016/0203209 | A1* | 7/2016 | Clinchant ............. G06N 20/00 707/738 |
| 2018/0137203 | A1* | 5/2018 | Hennekey .......... G06F 16/9535 |
| 2018/0293505 | A1* | 10/2018 | Bouveyron ............ H04L 41/16 |
| 2019/0044898 | A1* | 2/2019 | Shioya ................ H04L 51/043 |

OTHER PUBLICATIONS

Bengel et al., "ChatTrack: Chat Room Topic Detection Using Classification", Information & Telecommunication Technology Center, University of Kansas, 2335 Irving Hill Road, Lawrence Kansas 66045-7612, International Conference on Intelligence and Security Informatics, ISI 2004, 10 pages.

Blei et al., "Latent Dirichlet Allocation", Journal of Machine Learning Research 3 (2003) 993-1022, Submitted Feb. 2002; Published Jan. 2003, 30 pages.

Slack, "CatchUp", CatchUp | Slack App Directory, Accessed on Sep. 18, 2017, 2 pages.

Wang et al., "Context-based Message Expansion for Disentanglement of Interleaved Text Conversations", Human Language Technologies: The 2009 Annual Conference of the North American Chapter of the ACL, pp. 200-208, Technologies: The 2009 Annual Conference of the North American Chapter of the ACL, pp. 200-208, Boulder, Colorado, Jun. 2009.

Elsner et al., "Disentangling Chat", Computational Linguistics, vol. 36, No. 3, 2010, 22 pages.

Erera et al., "Conversation detection in email systems", ECIR'08 Proceedings of the IR research, 30th European conference on Advances in information retrieval, pp. 498-505, Glasgow, UK—Mar. 30-Apr. 3, 2008, Abstract, 2 pages.

Clinked, "Group Chat", Accessed on Sep. 18, 2017, 5 pages, http://clinked.com/features/group-chat/.

IBM, "IBM Sametime", Accessed on Sep. 18, 2017, 2 pages, http://www-03.ibm.com/software/products/en/ibmsame.

Wikipedia, "Latent Dirichlet allocation", https://en.wikipedia.org/wiki/Latent_Dirichlet_allocation, From Wikipedia, the free encyclopedia, 7 pages, Accessed on Sep. 18, 2017.

Wikipedia, "Markov chain Monte Carlo", https://en.wikipedia.org/wiki/Markov_chain_Monte_Carlo, From Wikipedia, the free encyclopedia, 7 pages, Accessed on Sep. 18, 2017.

Elsner et al., "Disentangling Chat with Local Coherence Models", Proceedings of the 49th Annual Meeting of the Association for Computational Linguistics, pp. 1179-1189, Portland, Oregon, Jun. 19-24, 2011.

Shen et al., "Thread Detection in Dynamic Text Message Streams", SIGR '06, Aug. 6-11, 2006, Seattle, Washington, USA, pp. 35-42.

Ramachandran et al., "Untangling Topic Threads in Chat-Based Communication: A Case Study", Analyzing Microtext: Papers from the 2011 AAAI Workshop (WS-11-05), Copyright © 2011, Association for the Advancement of Artificial Intelligence (www.aaai.org), 6 pages.

Kucukyilmaz et al., "Chat mining: Predicting user and message attributes in computer-mediated communication", Science Direct, Information Processing and Management, vol. 44, Issue 4, Jul. 2008, pp. 1-2.

Mayfield et al., "Hierarchical conversation structure prediction in multi-party chat", ResearchGate, Conference paper, Jul. 2012, Conference: Proceedings of the 13th Annual Meeting of the Special Interest Group on Discourse and Dialogue, pp. 1-4.

Wikipedia, "Dijkstra's algorithm", https://en.wikipedia.org/wiki/Dijkstra's_algorithm, printed May 16, 2017, pp. 1-11.

Manning, "Last Words—Computational Linguistics and Deep Learning", 2015 Association for Computational Linguistics, doi: 10.1162/COLI_a_00239, https://en.wikipedia.org/wiki/Dijkstra's_algorithm, pp. 1-7.

Chat Disentanglement, http://www.ling.ohio-state.edu/~elsner.14/resources/chat-manual.html, printed May 16, 2017, pp. 1-4.

Mell et al., "The NIST Definition of Cloud Computing", National Institute of Standards and Technology, Special Publication 800-145, Sep. 2011, pp. 1-7.

* cited by examiner

DATA CONVERGENCE

BACKGROUND

The present invention relates to data convergence, and in particular to convergence of data in different sets of heterogeneous data (such as data that is intertwined or entangled).

Data clustering may be applied to identify and create data clusters of homogenous data (e.g. data of the same type or format, or data relating to a single topic or theme) from a collection of unstructured heterogeneous data (e.g. data of the multiple types or formats, or data relating to multiple topics or themes).

By way of example, data clustering may be useful in applications, such as document management and retrieval, or chat messaging. In chat messaging, topic analysis may be applied to identify a subset of messages from a common conversation relating to a particular topic or theme over a period of time. Topic analysis may also analyze subsets of chat messages relating to a user-selected topic or theme, and provide the identified chat messages to the user for review at a later time. Such applications benefit from the restructuring (e.g. clustering) of otherwise chronologically-ordered and intertwined messages into cluster (e.g. groups) of similar and/or related messages. In yet another example, a collection of unstructured data or text may require classification into certain types or formats.

Such exemplary applications typically generate or include individual or independent sets of data. For example, messages or communications exchanged in a chat messaging system will normally be grouped by conversation or conversation thread, and each conversation or conversation thread may have a different group of contributing and/or participating members. Different sets of data may therefore be generated by, or associated with, differing conversations, conversation threads, workspace spaces, domain spaces, etc. However, conventional data clustering techniques and concepts are typically designed to be used on individual sets of data. This may result in individual sets of data being considered independently from each other, thus resulting in similarities, patterns, associations or relationships between data sets not being identified or catered for.

SUMMARY

The present disclosure provides a method for identifying data convergence. The method may provide for the identification of data convergence across multiple sets of heterogeneous data, and this may then be used to alert a user and/or consolidate data for more efficient data storage and/or processing.

The present disclosure further provides a computer program product including computer program code for implementing the method when executed on a processor of a data processing system.

The present disclosure yet further provides a data processing system adapted to execute this computer program code.

The present disclosure also provides a system for identifying data convergence.

According to one aspect of the present invention, there is provided a computer-implemented method for identifying data convergence. The method includes processing a first set of data comprising heterogeneous data in accordance with a data clustering algorithm so as to obtain a plurality of primary data clusters each comprising homogeneous data. The method also includes analyzing the plurality of primary data clusters with respect to time to identify convergence of data of the first set of data to a first topic over time. The method also includes processing a second set of data comprising heterogeneous data in accordance with a data clustering algorithm so as to obtain a plurality of secondary data clusters each comprising homogeneous data. The plurality of secondary data clusters is analyzed with respect to time to identify convergence of data of the second set of data to a second topic over time. The method then compares the first and second topics to determine a pattern of data convergence of data of the first and second data sets.

According to another aspect of the present invention, a computer program product for identifying data convergence is provided. The computer program product includes a computer readable storage medium having program instructions embodied therewith. The program instructions are executable by a processing unit to cause the processing unit to perform a method according to the aspect described in the preceding paragraph.

According to another aspect of the invention, a data processing system is provided, including at least one processor and the computer program product according to an embodiment. The at least one processor is adapted to execute the computer program code of the computer program product.

According to yet another aspect of the invention, a system for identifying data convergence is provided. The system includes a processing unit processing a first set of data comprising heterogeneous data in accordance with a data clustering algorithm so as to obtain a plurality of primary data clusters each comprising homogeneous data, and to process a second set of data comprising heterogeneous data in accordance with a data clustering algorithm so as to obtain a plurality of secondary data clusters each comprising homogeneous data. The system also includes an analysis unit to analyze the plurality of primary data clusters with respect to time to identify convergence of data of the first set of data to a first topic over time, and to analyze the plurality of secondary data clusters with respect to time to identify convergence of data of the second set of data to a second topic over time. The system further includes a comparison unit adapted to compare the first and second topics to determine a pattern of data convergence of data of the first and second data sets.

BRIEF DESCRIPTION OF THE DRAWINGS

Preferred embodiments of the present invention will now be described, by way of example only, with reference to the following drawings, in which.

DETAILED DESCRIPTION

Figure 1:
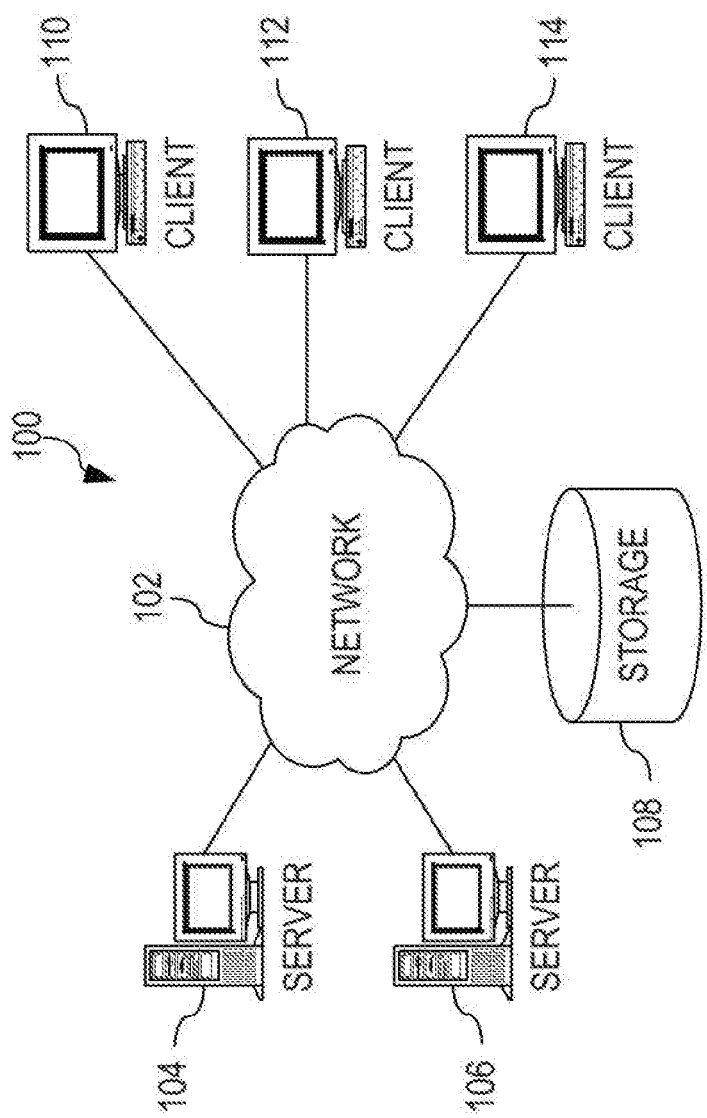
FIG. 1 depicts a pictorial representation of an example distributed system in which aspects of the illustrative embodiments may be implemented.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Disclosed are embodiments for identifying convergence of data between data sets that may be independent from each other. In particular, disclosed embodiments may identify convergence of data topics between time-varying data sets (such as chat channels, discussions, messaging sessions, communication threads, etc.) based on identifying similar data topics (e.g. conversation or discussion topics) in the data sets. By processing the data sets with a data clustering algorithm to obtain clusters of homogenous data (e.g. collections or sections of data relating the same topic), data topics for each data set may be identified and then compared to identify convergence across the data sets. In this way, the disclosed embodiments enable the identification of data convergence across multiple independent data sets (e.g. chat channels, discussions, messaging sessions, communication transcripts, etc.).

The disclosed embodiments may overcome shortcomings of conventional approaches by enabling the analysis of time-varying data sets in real-time, so as to enable the identification of converging data in real-time, for example.

Accordingly, embodiments of the disclosure improve or refine data sets by identifying data convergence. For instance, in response to identifying data convergence, action may be taken to avoid data duplication across the data sets and/or provide a new, tailored data set for the converging data. Improved data management, use and/or analysis through data clustering and data convergence identification may thus be provided.

Embodiments of the present disclosure also can provide clustering or disentangling of data to facilitate the efficient organization, presentation and/or retrieval of data from collections or repositories of unstructured or intertwined data.

Embodiments of the present disclosure can provide enhanced data convergence identification which can be employed across different data sets (e.g. separate spaces, isolated discussions, independent communication channels, etc.), and which may employ conventional data clustering techniques. Embodiments may thus provide data convergence identification in separate spaces or channels which can be used to improve the management and/or storage of data, for example, by consolidating the converging data into a single space and/or removing duplicate data from the separate spaces/channels. Disclosed embodiments may therefore enable a user to have a more detailed knowledge of data in and across data sets or spaces.

Embodiments may be employed in conjunction with conventional data clustering or data disentangling concepts that are undertaken automatically using machines. For example, by making a comparison between machine-obtained clustering results for two different datasets, a pattern of data convergence across the datasets may be identified. Such an identified pattern may be used to modify (e.g. refine or improve) and/or extract data of the datasets, thereby reducing or removing data duplication across the data sets.

As another example, an embodiment may be implemented to discover that certain topics converge across multiple spaces (e.g. discussions, chat groups, message board threads). Upon such a discovery, each user contributing to the same topic may be notified (e.g. via an alert message) that another space is discussing the same topic. In particular, by employing a method of topic term (or keyword) scoring (e.g. using a Maximum Likelihood Estimation (MLE) algorithm), an embodiment may determine how topics converge both within a space (i.e. intra-space) and across different spaces (i.e. inter-space). Once convergence of data across different spaces has been identified, notification of the identified data convergence may be initiated between participants/uses of the space(s).

Considering yet another example, an embodiment may be adapted to discover that the one or more topics converge across multiple spaces. Such a discovery of data convergence across multiple spaces may be indicated (e.g. via an alert notification or alerting mechanism) to all members or contributors of the spaces. Such an indication (e.g. alert) may notify the members/contributors that topics are converging in multiple spaces and advise of the creation of a new "topic Space" (e.g. which takes the converging messages or data from each space) so that users/contributors can make use of the new, dedicated space (rather than having to repeat data/contributions across multiple spaces).

In contrast to existing or conventional data convergence identification approaches which are applied in a linear fashion without identifying overlap with multiple spaces, the disclosed embodiments may be employed across separate datasets or spaces to provide a deeper understanding of contributions and areas of data convergence or overlap. By comparing results of automated data clustering performed on different data sets (e.g. across different discussions, document collections, or data spaces), data convergence may be identified and then used to suggest or undertake actions in relation to the converging data. The disclosed embodiments may thus employ one or more conventional data clustering algorithms and may then further comprise a step of comparing results from the data clustering algorithm(s) so as to determine a pattern of data convergence across the different data sets.

Disclosed embodiments may enable data (such as documents, communications, and messages) to be structured in groups according to redefined clusters, thereby enabling more accurate comparison of data across data sets or spaces for improved data convergence identification. By identifying data convergence across data sets or spaces, actions may be taken which help to reduce processing and storage resources (e.g. by avoiding data duplication and/or facilitating a new data set or space for the converging data).

Embodiments may further comprise generating an indication of data convergence of the first and second sets of data based on the determined pattern of data convergence. The step of generating an indication of data convergence may, for example, comprise generating a message comprising information relating to the determined pattern of data convergence and then communicating the message (e.g. to a user or separate entity). For instance, an alert signal may be provided to one or more contributors. The alert signal may communicate information about the identified data convergence and/or advise of actions that may be undertaken on the data. This may enable the provision of information about data convergence across multiple datasets and/or provide an opportunity to consent to (or prevent) suggested data actions. The disclosed embodiments may therefore empower users with increased information and/or control regarding identified data convergence across different data sets (e.g. independent discussions, or separate workspaces).

In some embodiments, data of the first and second sets of data may be consolidated into a third set of data based on the determined pattern of data convergence. For example, a new space specifically tailored for the converging data may be provisioned, and this may be done automatically. The automatic provisioning may include automatically provisioning a dedicated dataset (e.g. common platform). Furthermore, the original contributors of the converging data may be automatically provided access to the new, dedicated dataset, thus tailoring data access and provision to specific users/contributors and avoiding unnecessary data duplication for example.

The disclosed embodiments may further include, based on the determined pattern of data convergence, removing data from at least one of the first and second sets of data. For example, duplicate questions/answers that have been asked across spaces may be removed, thus enabling a conversation to be conveyed or presented without unnecessary repetition or resource consumption.

In an exemplary embodiment, comparing the first and second topics to determine a pattern of data convergence of data of the first and second sets may include: determining relevance scores for topics of the primary and secondary data clusters; determining differences between relevance scores of topics of the primary and secondary data clusters; and using the determined differences to identify a pattern of data convergence selected from the group comprising: increasing relevance of one or more topics, indicative of topic convergence; and decreasing relevance of one or more topics, indicative of topic divergence. By way of further example, determining relevance scores may comprise processing the primary and secondary data clusters with a maximum likelihood estimation, MLE, algorithm. Embodiments may, for example, compare a topic of discussion between an active channel (or space) and alternative channels (or spaces) using a distance comparison algorithm. Similar topics which are converging across channels may be identified based on topic term scoring using a MLE algorithm.

In an embodiment, each primary data cluster may be associated with a point in time. The process of analyzing the plurality of primary data clusters with respect to time to identify convergence of data of the first set of data to a first topic over time may then comprise: defining a first time slice of the first set of data using a first time interval to form a first plurality of consecutive primary data clusters; defining a second time slice of the first set of data using a second time interval to form a second plurality of consecutive primary data clusters; and comparing the data from the first plurality of consecutive primary data clusters and the second plurality of consecutive primary data clusters to identify a pattern of convergence of data of the first set of data to the first topic over time. Embodiments may, for example, be implemented to identify data convergence in real-time as a data set (e.g. discussion or chat board) is modified, and this may be done by analyzing data of a preceding time window (e.g. the last hour) and comparing it against data from another data set using a sliding window (moving from present to 24 hours prior for example). The sliding window applied to the other data set for comparison may be of the same length/duration (e.g. 1 hour) so that a comparison of data in the data sets may be made for different time windows. Analysis of how the comparison results change depending on a selected time window may help to identify a pattern or trend in the data, such as increasing similarity between datasets for increasing proximity in time being indicative of data convergence for example.

Comparing may, for example, comprise: using a determined difference between data from the first plurality of consecutive primary data clusters and the second plurality of consecutive primary data clusters to identify a pattern of data convergence selected from the group comprising: increasing similarity in data from the first plurality of consecutive primary data clusters and the second plurality for increasing proximity in time for the first and second time interval, indicative of data convergence; and decreasing similarity in data from the first plurality of consecutive primary data clusters and the second plurality for increasing proximity in time for the first and second time interval, indicative of data divergence.

The set of data may include a set of communications or documents. Processing the set of data in accordance with a data clustering algorithm may then include: dividing the communications or documents into data bundles; analyzing the data bundles to identify data similarity; and redefining the communications or documents based on identified data similarity. By identifying patterns indicative of topic convergence or topic drift, it may be possible to redefine the communication/document clusters, and/or reorder communications/documents within clusters, thus forming more homogenous clusters.

By way of example, where each communication or document is represented by a vector of words and associated with a point in time, processing the set of data in accordance with a data clustering algorithm may include: dividing the communications or documents into first time slices using a first time interval to form a plurality of consecutive sets of documents; sub-dividing each set of documents into one or more second time slices using respective second time intervals so as to form one or more subsets of documents; analyzing the documents in each set and subset of documents to identify a plurality of topics, each topic being represented by a set of most relevant topic keywords; clustering the documents in each set and subset of documents according to topic; comparing the topics from different sets and subsets of documents to identify patterns of changes in the relevance of topic keywords over time; and redefining the document clusters to form more homogenous clusters based on the identified patterns.

Furthermore, sub-dividing each set of documents into one or more second time slices may comprise sub-dividing each set of documents into two or more consecutive overlapping time slices. In an example implementation, a start time of each second time slice may be later that the start time of the corresponding first time slice by an offset time period, wherein the offset time period increases for each consecutive overlapping second time slice. By identifying the topics for overlapping time slices that are consecutive in time, and thus which include at least some of the same messages, it may be possible to infer how the topics change over time.

Also, comparing the topics from different sets and subsets of documents to identify patterns of changes in the relevance of topic keywords over time may comprise analyzing the topics from different sets and subsets of documents of overlapping time slices to identify patterns of changes in the relevance of topic keywords over time.

In an embodiment, comparing the topics from different sets and subsets of documents to identify patterns of changes in the relevance of topic keywords over time may include: determining delta differences between relevance scores of topic keywords of topics from sets and subsets of documents of consecutive overlapping time slices, and using the delta differences to identify patterns of changes selected from the group consisting of: increasing relevance of one or more topic keywords represented in multiple different topics over time, indicative of topic convergence, and decreasing relevance of one or more topic keywords represented in a particular individual topic over time, indicative of topic drift. For instance, a pattern of increasing relevance of one or more topic keywords represented in multiple different topics over time may be identified, indicative of topic convergence. A pattern of decreasing relevance of one or more topic keywords represented in a particular individual topic over time may be identified, indicative of topic drift.

By way of example, analyzing the data bundles may include performing data analysis on the communications or documents, the data analysis using Latent Dirichlet Allocation for maximum likelihood fit to identify a predefined number of data types, wherein each data type is represented by a set of most relevant data formats and each data format has an associated likelihood score indicative of relevance of the format. Disclosed embodiments may thus employ a known or conventional algorithm which may be improved via learning based on human analysis/supervision.

Also, it is noted that, although embodiments are presented in the context of being applicable to disentanglement of communications, discussions or messages, applicability of the disclosed embodiments may extend to other fields or types of data where the data has a degree of heterogeneous data which is unstructured, intertwined and/or disorganized. For example, embodiments may be implemented in relation to unstructured text that requires classification into given types.

Illustrative embodiments may therefore provide clustering or grouping of unstructured data, and the clustered/grouped data may then be compared across data sets to identify data convergence. Such disclosed embodiments may be applied to time-variant data sets by analyzing data of a current preceding time window and making a comparison with data from another data set using a sliding time window. Dynamic data clustering and convergence identification concepts may therefore be provided by disclosed embodiments.

Modifications and additional steps to a traditional data processing, storage and/or retrieval systems may also enhance the value and utility of the disclosed embodiments.

As the skilled person will appreciate, clustering involves organizing a set of data objects into groups, called "clusters", whose members are similar in some way. A cluster may therefore be a group of data objects which are similar to each other, and which are dissimilar from data objects in other groups or clusters. Typically, a cluster comprises a group of data objects that are associated with the cluster, and similarity between the data objects is represented by a set of representative members or features of the cluster. In the case of topic clusters for example, the members or features of the data objects are words, and each topic has a set of representative topic keywords, as described further below. As the skilled person will also appreciate, each data object may be associated with more than one cluster.

Figure 2:
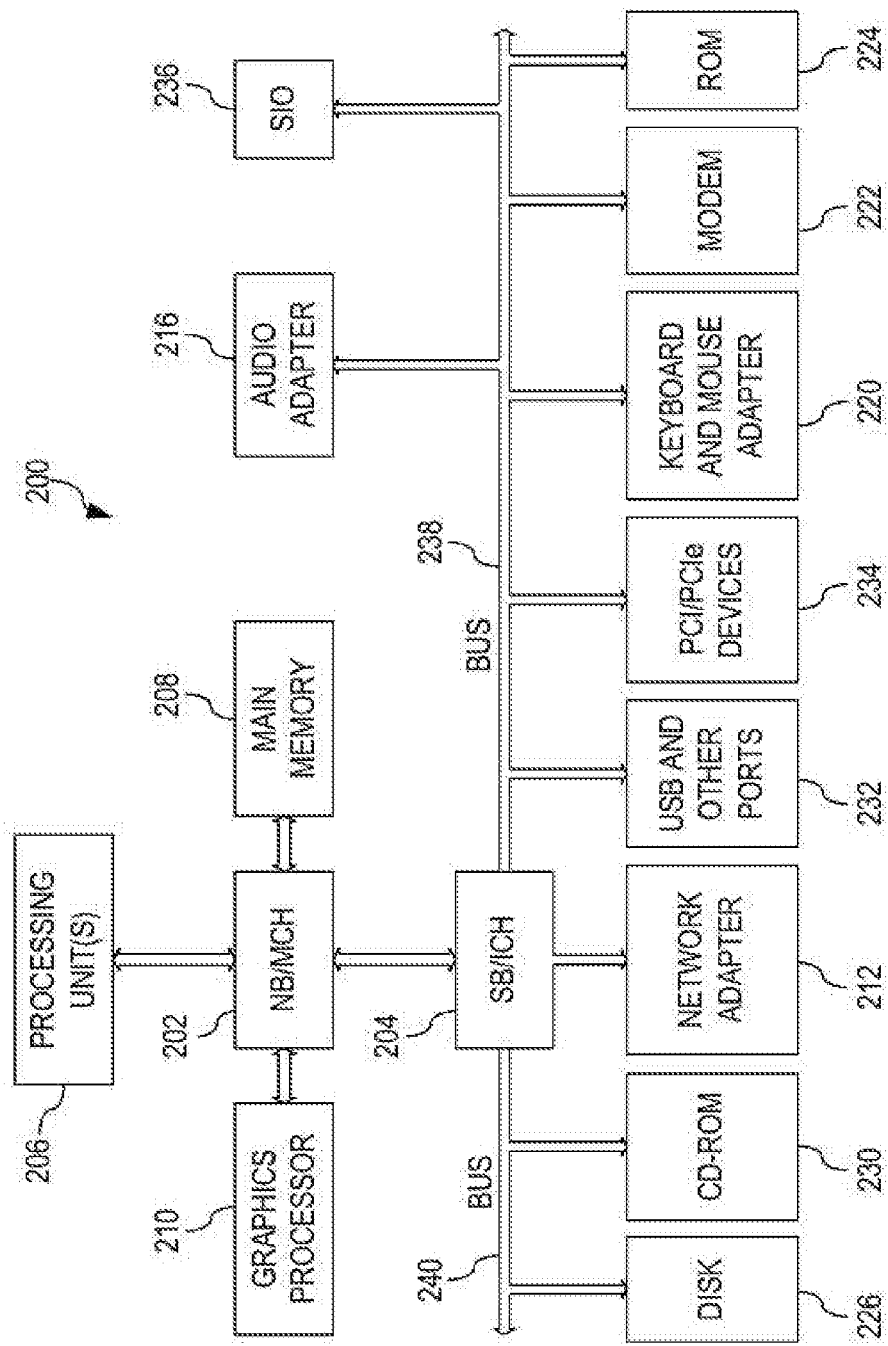
FIG. 2 is a block diagram of an example system in which aspects of the illustrative embodiments may be implemented.

Illustrative embodiments may be utilized in many different types of data processing environments. In order to provide a context for the description of elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, a symmetric multiprocessor (SMP) system including a plurality of processors in processing unit 206, or, alternatively, a single processor system.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

A disclosed embodiment may enhance a data convergence identification by employing data clustering and then employing data convergence identification across data sets or spaces. Examples may perform data clustering multiple times using sets and/subsets of data. In example implementations, the sets and/or subsets of data may be overlapping. Analysis of the discovered data similarities for changes over time may identify patterns of increasing and/or decreasing relevance over time. The patterns may then be used to determine more precise data bundles. In this way, the data may be structured or grouped with improved precision.

Figure 3:
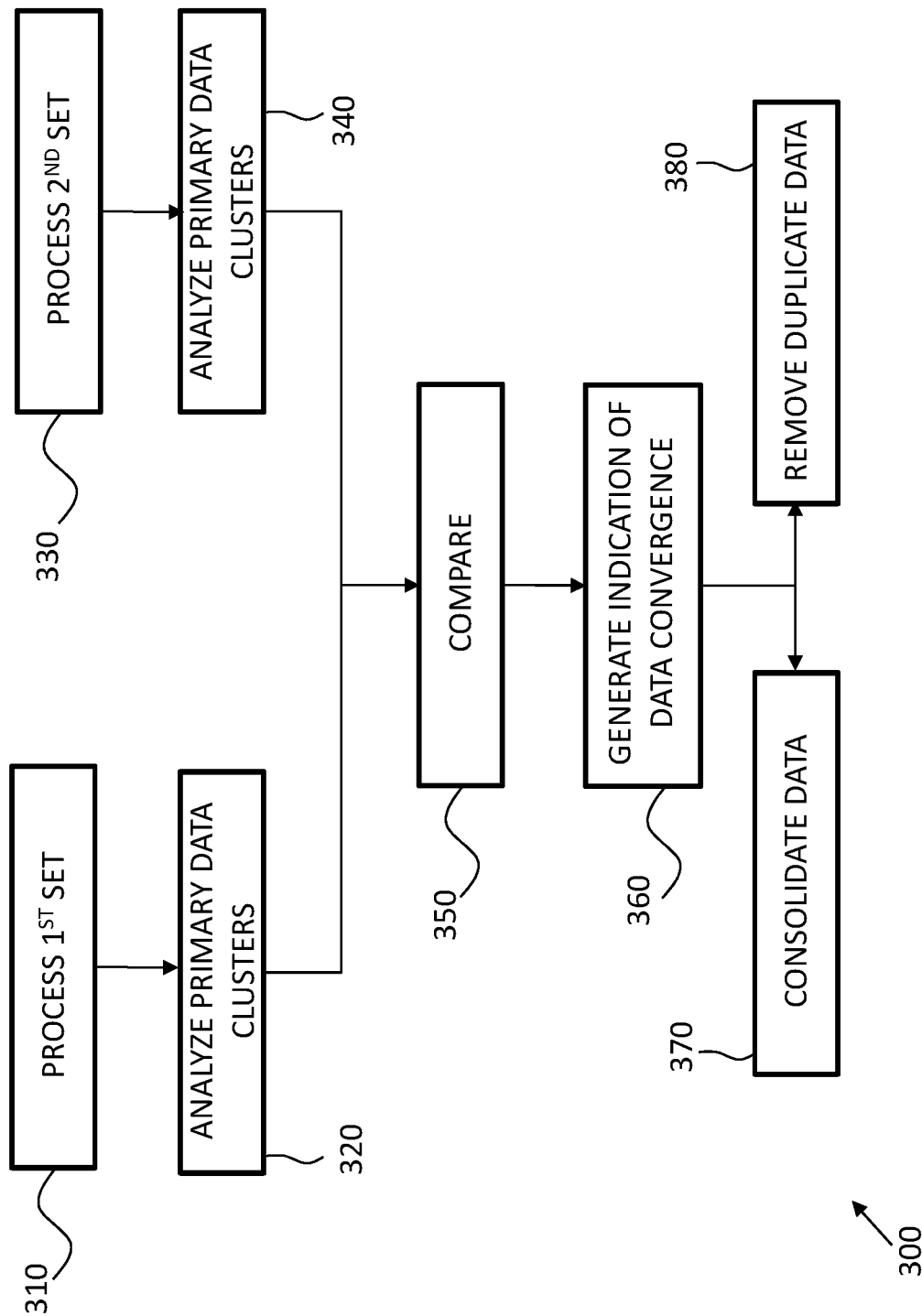
FIG. 3 is a flow diagram of a computer-implemented method for data clustering according to an embodiment.

Referring now to FIG. 3, there is depicted a flow diagram of a computer-implemented method 300 according to an embodiment.

In step 310, a first set of data comprising heterogeneous data is processed in accordance with a data clustering algorithm so as to obtain a plurality of primary data clusters each comprising homogeneous data. In other words, a known or existing clustering algorithm is executed so as to cluster a first set of heterogeneous data.

Here, by way of example, the first set of data includes a set of first collection of communications (such as electronic mail or text messages, for example) or documents (such as transcripts or written articles) in electronic format.

Also, processing the first set of data in accordance with a data clustering algorithm includes: dividing the communications or documents into data bundles; analyzing the data bundles to identify data similarity; and redefining the communications or documents based on identified data similarity. For instance, analyzing the data bundles may include performing data analysis on the communications or documents, whereby the data analysis uses Latent Dirichlet Allocation for maximum likelihood fit to identify a predefined number of data types for example, and wherein each data type may be represented by a set of most relevant data formats and each data format has an associated likelihood score indicative of relevance of the format.

It may thus be appreciated that, as a result of performing the step 310 of processing the first set of data with a data clustering algorithm, one or more primary data clusters comprising homogenous data may be obtained.

In step 320, the primary data clusters are analyzed with respect to time to identify convergence of data of the first set of data to a first topic over time. By way of example, the step 320 of analyzing the primary data clusters may include: defining a first time slice of the first set of data using a first time interval to form a first plurality of consecutive primary data clusters; and defining a second time slice of the first set of data using a second time interval to form a second plurality of consecutive primary data clusters. The data from the first plurality of consecutive primary data clusters and the second plurality of consecutive primary data clusters may then be compared to identify a pattern of convergence of data of the first set of data to the first topic over time. For instance, the comparison may use a determined difference between data from the first plurality of consecutive primary data clusters and the second plurality of consecutive primary data clusters to identify a pattern of data convergence. Such a pattern of data convergence may for example be selected from a group including: increasing similarity in data from the first plurality of consecutive primary data clusters and the second plurality for increasing proximity in time for the first and second time interval (being indicative of data convergence); and decreasing similarity in data from the first plurality of consecutive primary data clusters and the second plurality for increasing proximity in time for the first and second time interval (being indicative of data divergence).

In step 330 (which may be performed before, after or during execution of steps 310 and 320 for example), a second set of data comprising heterogeneous data is processed in accordance with a data clustering algorithm so as to obtain a plurality of secondary data clusters each comprising homogeneous data. In other words, a known or existing clustering algorithm is executed so as to cluster a second set of heterogeneous data.

Again, by way of example, the second set of data comprises a set of second collection of communications (such as electronic mail or text messages, for example) or documents (such as transcripts or written articles) in electronic format. Also, processing the second set of data in accordance with a data clustering algorithm includes: dividing the communications or documents into data bundles; analyzing the data bundles to identify data similarity; and redefining the communications or documents based on identified data similarity. Like for step 310 detailed above, the process of analyzing (in step 330) the data bundles may comprise performing data analysis on the communications or documents, wherein the data analysis uses Latent Dirichlet Allocation for maximum likelihood fit to identify a predefined number of data types for example, and wherein each data type may be represented by a set of most relevant data formats and each data format has an associated likelihood score indicative of relevance of the format.

It may thus be appreciated that, as a result of performing the step 330 of processing the second set of data with a data clustering algorithm, one or more secondary data clusters comprising homogenous data may be obtained.

In step 340 (and much like the step 320 detailed above), the secondary data clusters are analyzed with respect to time to identify convergence of data of the second set of data to a second topic over time.

In step 350, the first and second topics are compared to determine a pattern of data convergence of data of the first and second data sets. Here, the process of comparing the first and second topics comprises: determining relevance scores for topics of the primary and secondary data clusters (e.g. using a Maximum Likelihood Estimation (MLE) algorithm); determining differences between relevance scores of topics of the primary and secondary data clusters; and using the determined differences to identify a pattern of data convergence. The pattern of data convergence may, for example, be selected from the group comprising: increasing relevance of one or more topics, indicative of topic convergence; and decreasing relevance of one or more topics, indicative of topic divergence.

Based on the determined pattern of data convergence from step 350, an indication of data convergence of the first and second sets of data is then generated in step 360. Further, based on the determined pattern of data convergence, data of the first and second sets of data is consolidated into a third set of data (in step 370) and/or data is removed from at least one of the first and second sets of data (in step 380).

It will be understood that the method of FIG. 3 provides an embodiment for identifying convergence of data between data sets that may be independent from each other. In this way, convergence of data topics between time-varying data sets (such as chat channels, discussions, messaging sessions, communication threads, etc.) may be identified and this may be achieved based on identifying similar data topics (e.g. conversation or discussion topics) in the data sets.

The above example of FIG. 3 is presented in the general context of a clustering algorithm for clustering a set of electronic communications. However, it will be understood that the clustering algorithm(s) executed may be any suitable data clustering algorithm that may be used to form the primary and secondary data clusters from unstructured, heterogeneous and/or intertwined data.

Figure 4:
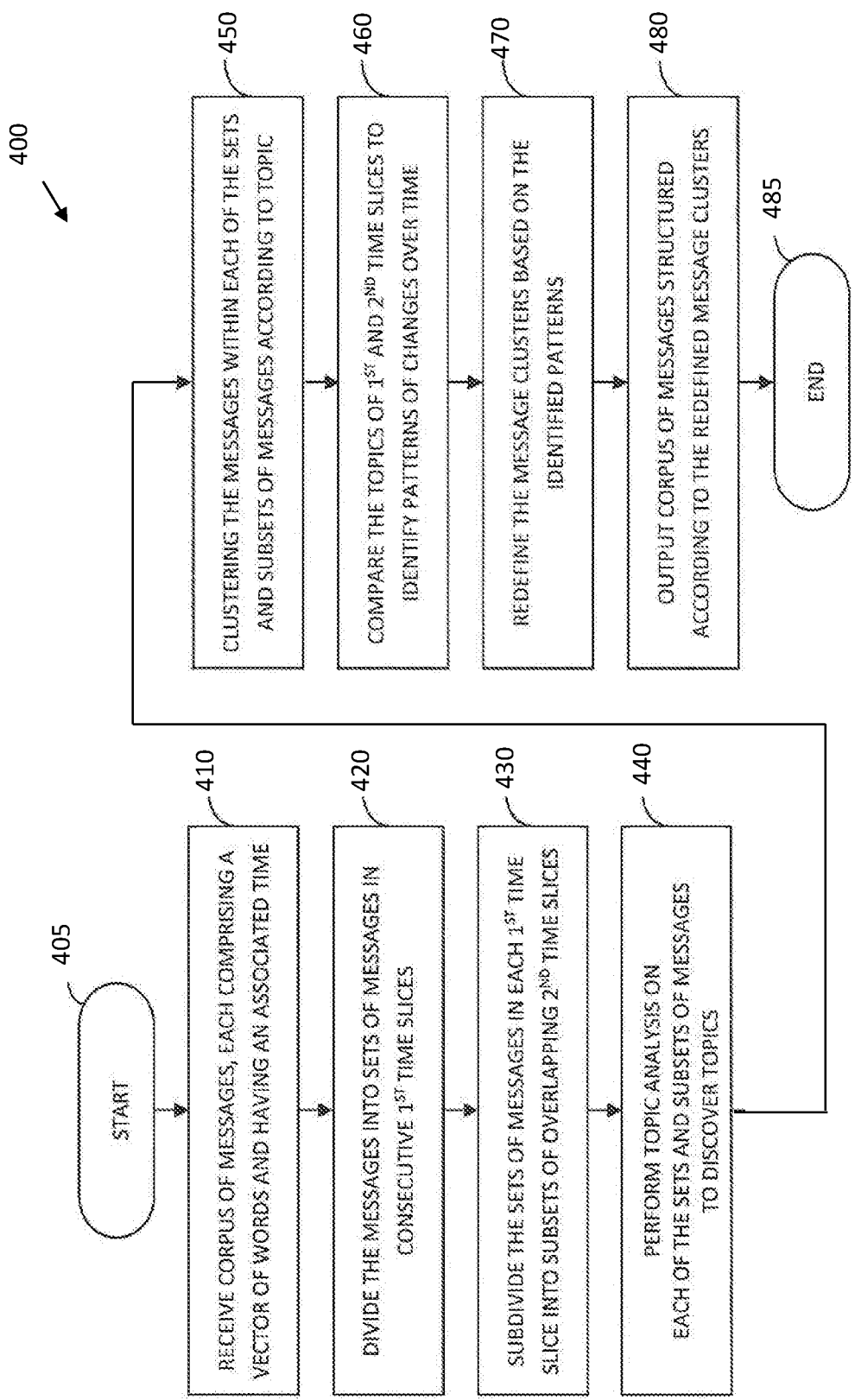
FIG. 4 depicts a method for clustering in accordance with example implementations.

By way of example, and simply to provide a more detailed understanding of the disclosed embodiments, an example algorithm that may be executed in step 310 and/or step 330 of the FIG. 3 will now be described with reference to FIG. 4, wherein FIG. 4 is a flow diagram of a method for clustering data objects comprising messages. In particular, the following exemplary implementation concerns the analysis and clustering of messages in a chat messaging system. Each message is associated with a particular point in time (e.g., by means of a timestamp) and includes text-based content in the form of an ordered plurality of words. Accordingly, a message may be regarded as a data object, which may be represented by a variable length vector of words, whereby the words form features or members of the data object (i.e., message). The data objects therefore comprise a set of messages, where each message may be processed by natural language processing to form a message vector of significant words in the message. Topic modeling may be used to discover the underlying topics in the set of messages, each topic having a representative set of keywords (i.e., "topic terms") that form a "topic bundle". Maximum likelihood estimation (MLE) may be used to determine the likelihood of keywords being present in a topic bundle (known as "relevancy" or "relevance"). A predefined number of topics may be identified based on the MLE scores. An example method for such topic discovery is Latent Dirichlet Allocation (LDA) topic modeling for maximum likelihood fit, as described above.

FIG. 4 depicts a method 400 for clustering of messages in accordance with example implementations. The method 400 may be performed by one or more modules, components and/or subsystems of a clustering system for structuring the messages in topic clusters or groups with increased precision for improved efficiency. In the illustrated method, the messages comprise representations of time-stamped messages of a chat messaging system, which are clustered in accordance with the method 400 based on topic or theme.

The method 400 starts at step 405. At step 410, the method receives a corpus of messages, for example from the chat messaging system. Each message is represented by a vector of words (called here "message vector") and is associated with a point in time (e.g., timestamp), as described above. The messages are typically received and processed in chronological order, but are otherwise unstructured. As the skilled person will appreciate, a raw text-based message is typically pre-processed (e.g., using a natural processing engine) to form a variable length vector of words, which may be normalized to a pre-defined fixed-length vector format of O to N words, corresponding to the N most important words in the message (e.g., most frequently occurring words).

At step 420, the method divides the message vectors into consecutive first (macro) time intervals of fixed length T. Thus, step 420 produces a plurality of first (macro) time slices, each comprising a set of message vectors that are associated with points in time during the corresponding first (macro) time interval T.

At step 430, the method subdivides the first (macro) time slices T into one or more second (micro) time intervals of length t, which is less than T (i.e., t<1). In example implementations, step 430 subdivides the first (macro) time slice T into two or more overlapping second (micro) time intervals of different lengths t, whereby each second (micro) time interval is offset from a point in time (e.g., start or end) of the first (macro) time interval by a different amount of time. Thus, for each first (macro) time slice T, step 130 produces one or more second (micro) time slices t, each comprising a subset of message vectors that are associated with points in time during the corresponding second (micro) time interval t.

As the skilled person will appreciate, steps 420 and 430 produce message samples, each comprising the set or subset of message vectors associated with the corresponding sampling time slice or interval (T or t). Each of these message samples is processed further, as described below.

At step 440, the method performs topic analysis, using each of the message samples (i.e., the set of messages in each first (macro) time slice T and the subset of messages in each second (micro) time slice t), to discover topics. Step 440 may use any suitable topic modeling or similar technique for discovering the underlying topics of the respective set or subset of messages of the message sample. For example, step 140 may analyze the messages using LDA topic modeling for maximum likelihood fit, in accordance with a predefined number of topics. The Latent Dirichlet Allocation (LDA) topic modeling, in conjunction with maximum likelihood estimation (MLE), identifies the predefined number of topics for each of the message samples, where each of the topics comprises a list of representative topic keywords (known in LDA as "term list") corresponding to the most frequently occurring words for the topic (e.g., keywords having the highest MLE scores).

At step 450, the method clusters the messages of the message samples of each first (macro) time slice T and each second (micro) time slice t according to the identified topics. In particular, step 450 may associate the messages of each of the message samples with the identified topics based on the words of the message vectors and the representative keywords of the topics. Step 450 may use any suitable technique for inferring the association of a message with one or more topics and the corresponding measure (e.g., proportion) of association of the message with an individual topic. Thus, step 450 may be considered as building a topic map or multi-layer graph that associates messages with topics for multiple overlapping (macro and micro) time slices.

At step 460, the method compares the topics, comprising topic bundles of representative keywords and associated MLE scores, produced in step 440 across different time slices (i.e., message samples) to identify patterns of changes in topics over time. In particular, step 460 may compare topics across different time slices to identify patterns of increasing or decreasing relevance of representative keywords of topics over time. For example, step 460 may compare the topics, comprising the representative topic keywords and associated MLE scores thereof, across different time slices to identify a pattern of decreasing keyword relevance in a topic over time, herein called "topic drift". Topic drift corresponds to a reduction in the likelihood of representative keywords being present in an individual topic or topic bundle over time. In particular, step 460 may compare the topics from each first (macro) time slice T with the topics from each overlapping second (micro) time slice t. Further, step 460 may compare the topics from adjacent/consecutive overlapping second (micro) time slices t within the same first (macro) time slice T. Moreover, step 460 may compare the topics from a first (macro) or second (micro) time slice with the topics from another, typically adjacent, consecutive and/or overlapping, first (macro) or second (micro) time slice. In any event, step 460 may compare topics derived by topic modeling using the message samples of different adjacent, consecutive and/or overlapping time slices by comparing the MLE scores of matching representative keywords over time, in order to determine a measure of the reduction of the MLE scores of keywords in a topic bundle over time (i.e., "topic drift").

In another example, step 460 may compare the topics, comprising the representative topic keywords and associated MLE scores thereof, produced in step 440 across different time slices to identify a pattern of increasing keyword relevance in multiple topics (i.e., topic bundles) over time, herein called "topic convergence". Topic convergence corresponds to an increase in the likelihood of the same representative keywords being present in separate topic bundles over time. Accordingly, step 460 may compare topics derived from different first (macro) time slices T and second (micro) time slices t in a variety of ways, for example as discussed above in relation to topic drift. Step 460 typically compares topics derived by topic modeling using the message samples of different consecutive, adjacent and/or overlapping time slices by comparing the MLE scores of matching representative keywords over time, in order to determine a measure of the increase of the MLE scores of keywords in topic bundles over time (i.e., "topic convergence"). Further details about topic convergence are provided below.

At step 470, the method redefines the message clusters based on the identified patterns, such as topic drift and/or topic convergence. In particular, step 470 may re-associate messages with clusters (i.e., groups of topics) and/or reorder messages within clusters based on the determined topic drift and/or topic convergence (e.g., based on identified patterns of increasing or decreasing MLE scores of representative keywords of topics over time). Step 470 may re-associate messages with clusters when topic drift and/or topic convergence is identified and according to the level of topic drift and/or topic convergence (e.g., whether the increase or decrease in MLE scores of representative keywords over time exceeds a predefined threshold indicative of "high" topic drift or "high" topic convergence, respectively). In some examples, messages associated with two or more topics that have high topic convergence may be re-associated with a single topic to form a more homogeneous message cluster. The single message cluster may be associated with a new topic or a merged topic, based on a combination of the representative keywords of each of the two or more topics. The messages in the single cluster forming a topic group are therefore more homogenous. In other example implementations, a subset of messages associated with a topic that has high topic drift may be re-associated with a separate new topic. The separate new topic may comprise representative keywords consistent with a new topic or theme. The subset of messages associated with the new topic may form a more homogeneous cluster (i.e., topic group), and, similarly, the subset of messages that remain associated with the original topic may form a more homogeneous topic group. In example implementations, for example when topic drift or topic convergence is identified at lower level (e.g., below the abovementioned predefined threshold), messages may be reordered within a cluster based on MLE scores of representative keywords. For example, messages associated with a cluster having the same keywords with the same or similar MLE scores, and thus relating to the same theme within the relatively stable topic cluster, may be re-ordered so that messages having the same theme are closer together within a cluster, rather than moved to a separate new cluster.

At step 480, the method may output the corpus of messages structured in accordance with the redefined clusters provided in step 470, and thus as a structured set of topic groups for use in management and retrieval of the messages. The method ends at step 485.

As will be appreciated, the method 400 may be repeated iteratively. For example, the method may be repeated iteratively using a start time for message sampling that is offset by a time period x from the start time Y of the first iteration (where the offset x is less that T and preferably less than t). In another example, the method may be repeated iteratively using further second (micro) time slices t' of reduced size (i.e. t'<t). Thus, message samples from subsequent iterations may overlap message samples from preceding iterations. In any event, the method may be repeated iteratively using different first (macro) time slices and/or second (micro) time slices. Such iterative repetitions may be appropriate when no patterns of topic convergence and/or topic drift are identified and/or a threshold level is not satisfied. Each iteration may be performed as part of a feedback loop, following the possible identification of topic drift and/or topic convergence and redefining of clusters, in the previous iteration. The use of feedback loops may be appropriate to achieve a desired degree of confidence in the resulting redefined clusters.

Also, as the skilled person will appreciate, step 460 involves analysis to identify patterns of changes in MLE scores (or equivalent) of topic keywords over time, which may identify topic drift (corresponding to reducing MLE scores of topic keywords over time) and/or topic convergence (corresponding to increasing MLE scores over time). Accordingly, step 460 may be divided into two separate steps, one to identify patterns of changes which represent topic drift and the other to identify patterns of changes which represent topic convergence.

Although the above description of the method of FIG. 4 has been provided so as to detail an example clustering method that may be implemented in accordance with various embodiments of the present disclosure, it is to be understood that embodiments need not be limited to such chat/message disentanglement. Rather, disclosed embodiments may be used in conjunction with any unstructured data which has a degree of heterogeneous data (e.g. data which is intertwined).

Rather than being restricted to message disentanglement, disclosed embodiments may, for example, be employed in relation to unstructured text that requires classification into given types or formats. For instance, a discriminant function could be derived to determine if text is a salutation, valediction, or neither. Such a discriminant function may be (computationally or resource) expensive to execute over multiple iterations and/or corpora, so by employing the learning method disclosed herein, time and effort required to classify text may be greatly reduced.

Figure 5A:
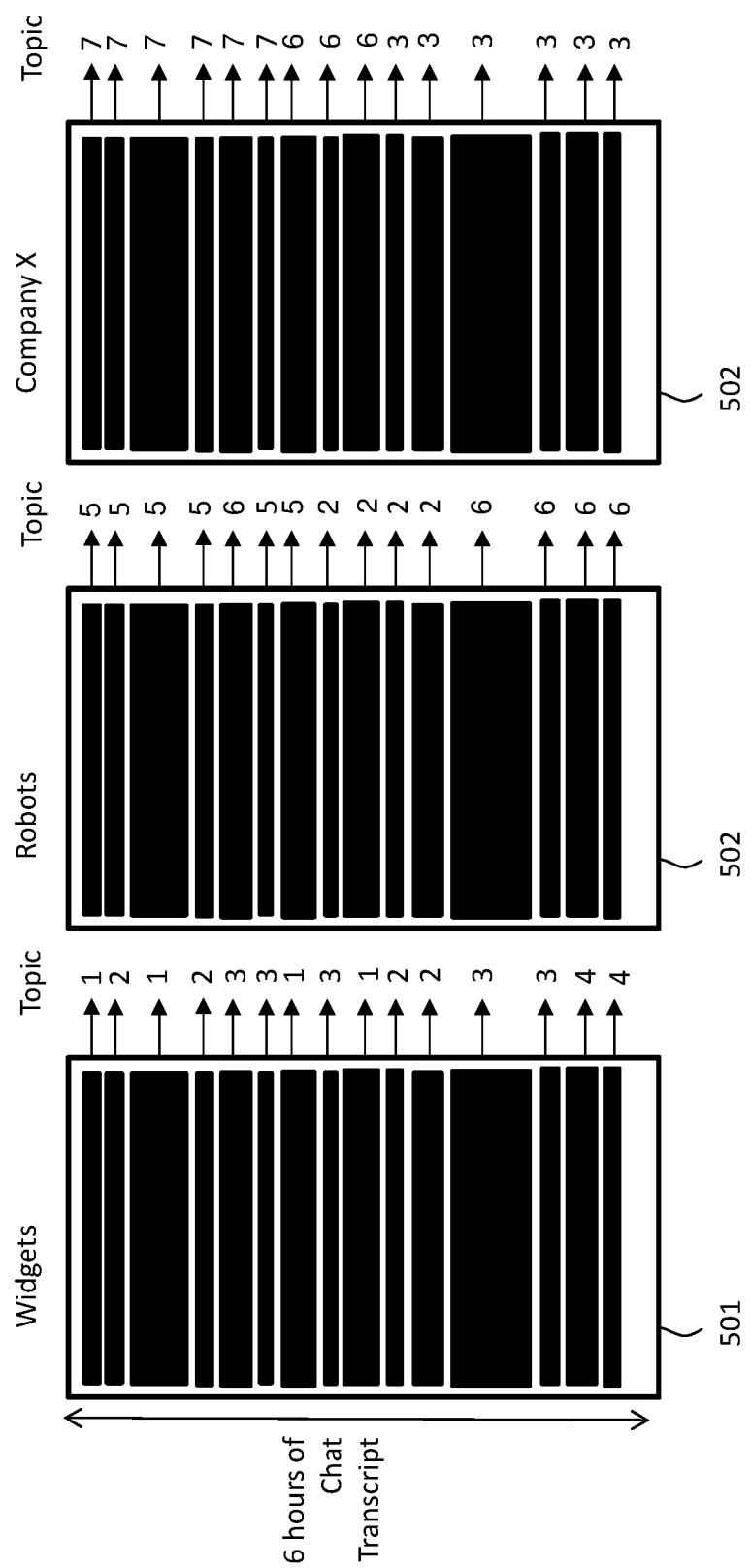
FIGS. 5A-5C illustrating analysis of a chat transcripts across a plurality of spaces in accordance with a proposed embodiment.
Figure 5B:
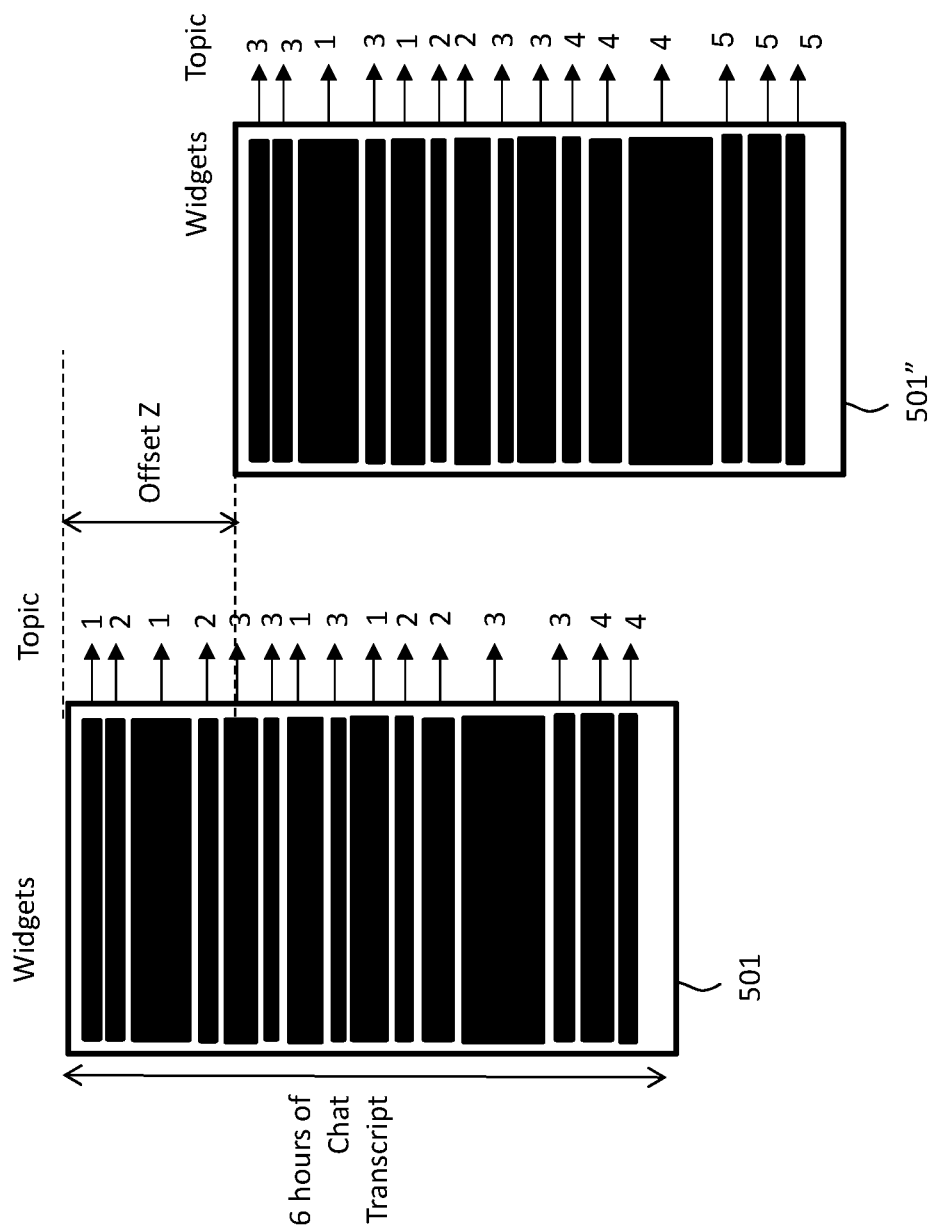
Figure 5C:
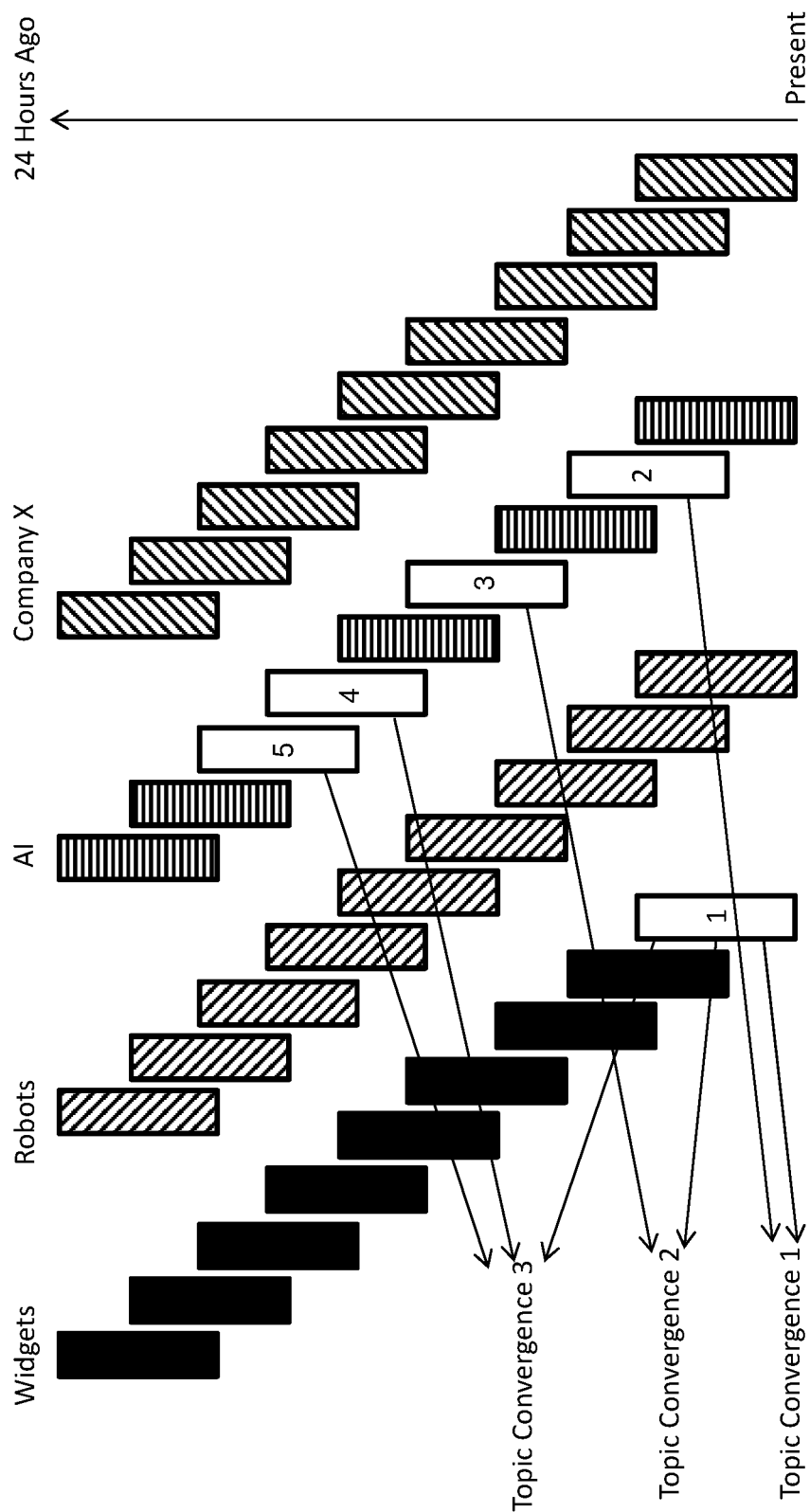

Referring now to FIG. 5A to 5C, and by way of providing a further example of how disclosed embodiments may be implemented, one may consider undertaking chat disentanglement of a first 501 to third 503 chat transcripts (e.g. for a time period of six hours). Firstly, an initial chat disentanglement may be undertaken on each transcript using a process as described above with reference to FIG. 4. Next, the disclosed embodiments for identifying data convergence across the transcripts 501, 502, 503 may be undertaken. The first transcript 501 may, for example, be a transcript of a discussion within a space relating to "Widgets", whereas the second transcript 502 may be a transcript of a discussion within a space relating to "Robots" and the third transcript 503 may be a transcript of a discussion within a space relating to "Company X". The transcripts may thus be thought of as heterogeneous data channels.

The clusters, or bundles, created by the disentanglement process are depicted using horizontal lines or blocks, wherein each cluster includes content that predominately relates to an associated topic (as indicated the respective arrows situated alongside the clusters).

Referring to Figure 5A, it may be seen that topic convergence take places across the first transcript 501 and third transcript 503. More specifically, the first transcript 5010 for the "Widgets" space comprises multiple clusters relating to Topic 3, and the third transcript 503 for the "Company X" space also comprises multiple clusters relating to Topic 3 towards the bottom of the transcript. Thus, over the six hour period, one sees topic convergence to Topic 3 in the "Widgets" and "Company X" spaces.

Referring now to FIG. 5B, an Offset Z is used to calculate multiple offsets of the "Robots" space. Topic convergence may thus be identified in real-time by starting with the most recent offset and doing a comparison across the topic in other spaces offsets over a period of time. For instance, as depicted in FIG. 5C, offsets of analysis across may identify first to third topic convergences (e.g. "Topic Convergence 1", "Topic Convergence 2" and "Topic Convergence 3").

Once Offset 1 in space "Robots" has completed its topic analysis then a topic convergence begins. For example, Offset 1 in the "Robots" space may be summarized as in Table 1 below:

TABLE 1

| Bundle 1 (max likelihood) | Bundle 2 (max likelihood) | Bundle 3 (max likelihood) |
| --- | --- | --- |
| metal (0.34) | robots (0.76) | wrist ( 0.5 ) |
| robots (0.83) | world (0.32) | robots (0.75) |
| domination (0.67) | science (0.34) | brain (0.87) |

A topic term comparison occurs from Offset 1 in Space Robots with other Spaces and their offsets over T amount of time. This comparison is done on each of the offsets topic bundles and their topic terms. A match occurs when the same topic terms occur in another space's offsets.

FIG. 5C graphically illustrates an example of topic convergence across the spaces. The numbers provided in the rectangles/blocks illustrate where a convergence of data to a topic has been identified. Such convergences may be used to drive alerting to inform users.

For example, in FIG. 5C, we see topic convergence occurring in the "AI" space for offsets marked "2" and "3" and for offsets marked "4" and "5".

This convergence is found using the following method. Offset 2 in the "AI" space may be summarized as in Table 2 below:

TABLE 2

| Bundle 1 (max likelihood) | Bundle 2 (max likelihood) | Bundle 3 (max likelihood) |
|---|---|---|
| metal (0.34) | fear (0.76) | musk (0.5) |
| robots (0.84) | world (0.32) | robots (0.85) |
| domination (0.67) | elon (0.34) | spacex (0.87) |

Similarly, Offset 3 in the "AI" space may be summarized as in Table 3 below:

TABLE 3

| Bundle 1 (max likelihood) | Bundle 2 (max likelihood) | Bundle 3 (max likelihood) |
|---|---|---|
| metal (0.34) | world (0.76) | robots (0.85) |
| robots (0.87) | elon (0.32) | metals (0.75) |
| domination (0.67) | futurama (0.34) | arms (0.87) |

(Topic Terms Found MLE value in an Offset in a different space)>=(Matched Topic Term MLE in Offset 1). As one compares within a space and moves up through the offsets comparing against the Offset 1 in "Robots" space, we note the distance between offsets. This ends up with a stored comparison from the present offset of a space to its offset 24 hours ago. It may be noted when there is a match between offsets that are beside each other and this may be indicated as a single topic convergence rather than individual ones. Once topic convergence is identified the following actions can occur: (i) a user can be notified in Space Robots that convergence is occurring in another space; and/or (ii) a transient topic space can be created to notify of this convergence.

Accordingly, it will be appreciated that identifying topic convergence across multiple spaces is provided.

In some embodiments, there may be provided a system comprising a processing arrangement adapted to carry out any method previously described with reference to FIGS. 1 to 5.

Figure 6:
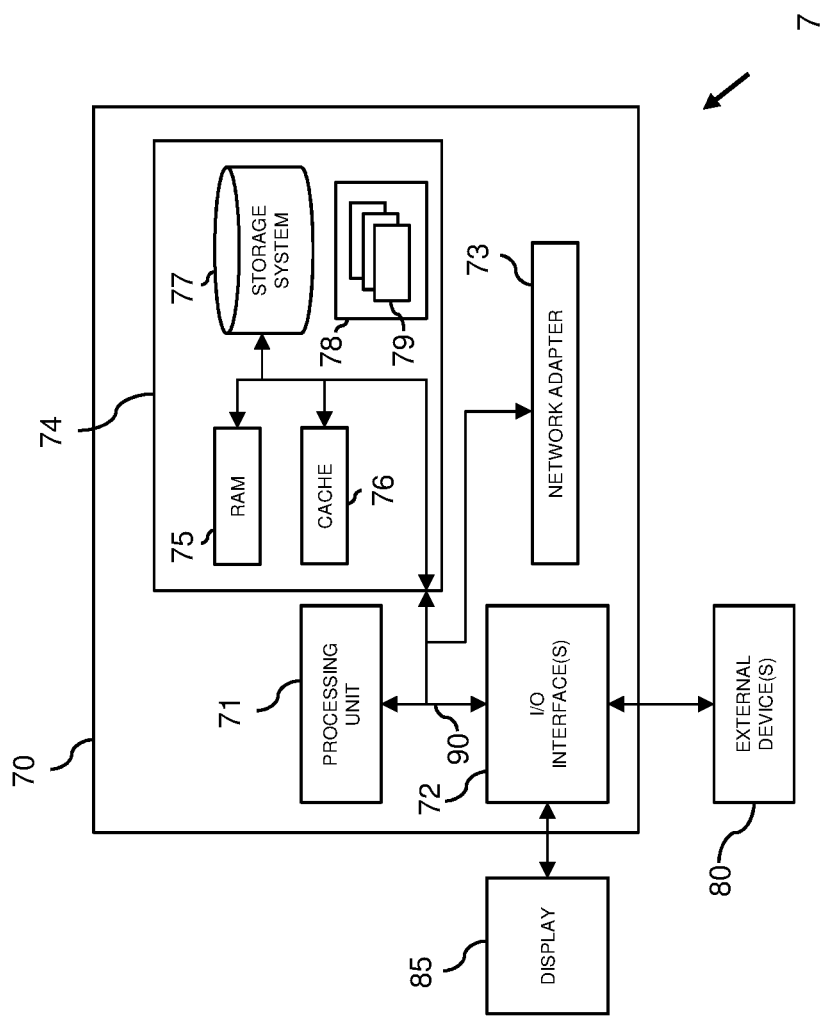
FIG. 6 illustrates a system according to an embodiment.

By way of example, as illustrated in FIG. 6, embodiments may include a computer system 70, which may form part of a networked system 7. The components of computer system/server 70 may include, but are not limited to, one or more processing arrangements, for example comprising processors or processing units 71, a system memory 74, and a bus 90 that couples various system components including system memory 74 to processing unit 71.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 typically includes a variety of computer system readable media. Such media may be any available media that is accessible by computer system/server 70, and it includes both volatile and non-volatile media, removable and non-removable media.

System memory 74 can include computer system readable media in the form of volatile memory, such as random access memory (RAM) 75 and/or cache memory 76. Computer system/server 70 may further include other removable/non-removable, volatile/non-volatile computer system storage media. By way of example only, storage system 74 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set (e.g., at least one) of program modules that are configured to carry out the functions of embodiments of the invention.

Program/utility 78, having a set (at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the invention as described herein.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for identifying data convergence, the method comprising:
    processing a first set of data comprising heterogeneous data in accordance with a data clustering algorithm so as to obtain a plurality of primary data clusters, wherein each primary data cluster is associated with a point in time, and wherein each of the plurality of primary data clusters comprises homogeneous data;

analyzing the plurality of primary data clusters with respect to time to identify convergence of data of the first set of data to a first topic over time further comprising:
defining a first time slice of the first set of data using a first time interval to form a first plurality of consecutive primary data clusters;
defining a second time slice of the first set of data using a second time interval to form a second plurality of consecutive primary data clusters; and
comparing the data from the first plurality of consecutive primary data clusters and the second plurality of consecutive primary data clusters to identify a pattern of convergence of data of the first set of data to the first topic over time;
processing a second set of data comprising heterogeneous data in accordance with a data clustering algorithm so as to obtain a plurality of secondary data clusters, wherein each primary data cluster is associated with a point in time, and wherein each of the plurality of primary data clusters comprises homogeneous data, wherein the processing further comprises:
dividing the communications or documents into data bundles;
analyzing the data bundles to identify data similarity; and
redefining the communications or documents based on identified data similarity;
analyzing the plurality of secondary data clusters with respect to time to identify convergence of data of the second set of data to a second topic over time; and
comparing the first and second topics to determine a pattern of data convergence of data of the first and second data sets further comprising:
determining relevance scores for topics of the primary and secondary data clusters;
determining differences between relevance scores of topics of the primary and secondary data clusters;
using the determined differences to identify a pattern of data convergence selected from the group comprising:
increasing relevance of one or more topics, indicative of topic convergence; and decreasing relevance of one or more topics, indicative of topic divergence;
processing a set of data in accordance with a data clustering algorithm,
wherein the set of data comprises a set of communications or documents, comprising:
dividing the communications or documents into data bundles;
analyzing the data bundles to identify data similarity; and
redefining the communications or documents based on identified data similarity.

2. The method of claim 1, further comprising:
based on the determined pattern of data convergence, generating an indication of data convergence of the first and second sets of data,
and optionally wherein the step of generating an indication of data convergence comprises generating a message comprising information relating to the determined pattern of data convergence and communicating the message.

3. The method of claim 1, further comprising:
based on the determined pattern of data convergence, consolidating data of the first and second sets of data into a third set of data.

4. The method of claim 1, further comprising:
based on the determined pattern of data convergence, removing data from at least one of the first and second sets of data.

5. The method of claim 1, wherein determining relevance scores comprises processing the primary and secondary data clusters with a maximum likelihood estimation, MLE, algorithm.

6. The method of claim 1, wherein comparing comprises:
using a determined difference between data from the first plurality of consecutive primary data clusters and the second plurality of consecutive primary data clusters to identify a pattern of data convergence selected from the group comprising: increasing similarity in data from the first plurality of consecutive primary data clusters and the second plurality for increasing proximity in time for the first and second time interval, indicative of data convergence; and decreasing similarity in data from the first plurality of consecutive primary data clusters and the second plurality for increasing proximity in time for the first and second time interval, indicative of data divergence.

7. The method of claim 1, wherein each communication or document is represented by a vector of words and associated with a point in time,
and wherein processing the set of data in accordance with a data clustering algorithm comprises:
dividing the communications or documents into first time slices using a first time interval to form a plurality of consecutive sets of documents;
sub-dividing each set of documents into one or more second time slices using respective second time intervals so as to form one or more subsets of documents;
analyzing the documents in each set and subset of documents to identify a plurality of topics, each topic represented by a set of most relevant topic keywords;
clustering the documents in each set and subset of documents according to topic;
comparing the topics from different sets and subsets of documents to identify patterns of changes in the relevance of topic keywords over time; and
redefining the document clusters to form more homogenous clusters based on the identified patterns.

8. The method of claim 1, wherein sub-dividing each set of documents into one or more second time slices, comprises sub-dividing each set of documents into two or more consecutive overlapping time slices.

9. The method of claim 1, wherein comparing the topics from different sets and subsets of documents to identify patterns of changes in the relevance of topic keywords over time comprises analyzing the topics from different sets and subsets of documents of overlapping time slices to identify patterns of changes in the relevance of topic keywords over time.

10. The method of claim 1, wherein comparing the topics from different sets and subsets of documents to identify patterns of changes in the relevance of topic keywords over time, comprises:
determining delta differences between relevance scores of topic keywords of topics from sets and subsets of documents of consecutive overlapping time slices, and
using the delta differences to identify patterns of changes selected from the group consisting of: increasing relevance of one or more topic keywords represented in multiple different topics over time, indicative of topic convergence, and decreasing relevance of one or more topic keywords represented in a particular individual topic over time, indicative of topic drift.

11. The method of claim 1, wherein analyzing the data bundles comprises:
performing data analysis on the communications or documents, the data analysis using Latent Dirichlet Allocation for maximum likelihood fit to identify a predefined number of data types, wherein each data type is represented by a set of most relevant data formats and each data format has an associated likelihood score indicative of relevance of the format.

12. A computer program product for identifying data convergence, the computer program product comprising a computer readable storage medium having program instructions embodied therewith, the program instructions executable by a processing unit to cause the processing unit to perform a method comprising:
processing a first set of data comprising heterogeneous data in accordance with a data clustering algorithm so as to obtain a plurality of primary data clusters, wherein each primary data cluster is associated with a point in time, and wherein each of the plurality of primary data clusters comprises homogeneous data;
analyzing the plurality of primary data clusters with respect to time to identify convergence of data of the first set of data to a first topic over time further comprising:
defining a first time slice of the first set of data using a first time interval to form a first plurality of consecutive primary data clusters;
defining a second time slice of the first set of data using a second time interval to form a second plurality of consecutive primary data clusters; and
comparing the data from the first plurality of consecutive primary data clusters and the second plurality of consecutive primary data clusters to identify a pattern of convergence of data of the first set of data to the first topic over time;
processing a second set of data comprising heterogeneous data in accordance with a data clustering algorithm so as to obtain a plurality of secondary data clusters, wherein each primary data cluster is associated with a point in time, and wherein each of the plurality of primary data clusters comprises homogeneous data, wherein the processing further comprises:
dividing the communications or documents into data bundles;
analyzing the data bundles to identify data similarity; and
redefining the communications or documents based on identified data similarity;
analyzing the plurality of secondary data clusters with respect to time to identify convergence of data of the second set of data to a second topic over time; and
comparing the first and second topics to determine a pattern of data convergence of data of the first and second data sets further comprising:
determining relevance scores for topics of the primary and secondary data clusters;
determining differences between relevance scores of topics of the primary and secondary data clusters;
using the determined differences to identify a pattern of data convergence selected from the group comprising:
increasing relevance of one or more topics, indicative of topic convergence; and decreasing relevance of one or more topics, indicative of topic divergence;
processing a set of data in accordance with a data clustering algorithm,
wherein the set of data comprises a set of communications or documents, comprising:
dividing the communications or documents into data bundles;
analyzing the data bundles to identify data similarity; and
redefining the communications or documents based on identified data similarity.

13. A system for identifying data convergence, the system comprising a memory having computer readable instructions, and one or more processors for executing the computer readable instructions, the computer readable instruction controlling the one or more processors to perform operations comprising:
processing a first set of data comprising heterogeneous data in accordance with a data clustering algorithm so as to obtain a plurality of primary data clusters, wherein each primary data cluster is associated with a point in time, and wherein each of the plurality of primary data clusters comprises homogeneous data;
analyzing the plurality of primary data clusters with respect to time to identify convergence of data of the first set of data to a first topic over time further comprising:
defining a first time slice of the first set of data using a first time interval to form a first plurality of consecutive primary data clusters;
defining a second time slice of the first set of data using a second time interval to form a second plurality of consecutive primary data clusters; and
comparing the data from the first plurality of consecutive primary data clusters and the second plurality of consecutive primary data clusters to identify a pattern of convergence of data of the first set of data to the first topic over time;
processing a second set of data comprising heterogeneous data in accordance with a data clustering algorithm so as to obtain a plurality of secondary data clusters, wherein each primary data cluster is associated with a point in time, and wherein each of the plurality of primary data clusters comprises homogeneous data, wherein the processing further comprises:
dividing the communications or documents into data bundles;
analyzing the data bundles to identify data similarity; and
redefining the communications or documents based on identified data similarity;
analyzing the plurality of secondary data clusters with respect to time to identify convergence of data of the second set of data to a second topic over time; and
comparing the first and second topics to determine a pattern of data convergence of data of the first and second data sets further comprising:
determining relevance scores for topics of the primary and secondary data clusters;

determining differences between relevance scores of topics of the primary and secondary data clusters;

using the determined differences to identify a pattern of data convergence selected from the group comprising:

increasing relevance of one or more topics, indicative of topic convergence; and decreasing relevance of one or more topics, indicative of topic divergence;

processing a set of data in accordance with a data clustering algorithm, wherein the set of data comprises a set of communications or documents, comprising:

dividing the communications or documents into data bundles;

analyzing the data bundles to identify data similarity; and redefining the communications or documents based on identified data similarity.

14. The system of claim 13, further comprising:
generating an indication of data convergence of the first and second sets of data based on the determined pattern of data convergence, and optionally generating a message comprising information relating to the determined pattern of data convergence and to communicate the message.

15. The system of claim 13 wherein the comparing comprises:
using a determined difference between data from the first plurality of consecutive primary data clusters and the second plurality of consecutive primary data clusters to identify a pattern of data convergence selected from the group comprising: increasing similarity in data from the first plurality of consecutive primary data clusters and the second plurality for increasing proximity in time for the first and second time interval, indicative of data convergence; and decreasing similarity in data from the first plurality of consecutive primary data clusters and the second plurality for increasing proximity in time for the first and second time interval, indicative of data divergence.

* * * * *